United States Patent Office  3,729,527
Patented Apr. 24, 1973

3,729,527
THERMOPLASTIC POLYMER BLENDS OF POLY-
AMIDES AND POLYARYLSULFONES
Eric Nield, Watton-at-Stone, England, assignor to Imperial Chemical Industries Limited, London, England
No Drawing. Filed Apr. 28, 1971, Ser. No. 138,286
Int. Cl. C08g 41/04
U.S. Cl. 260—857 R  5 Claims

ABSTRACT OF THE DISCLOSURE

Thermoplastic polymer blends which contain from 99% to 1% of one or more aromatic polysulphones and from 1% to 99% of one or more thermoplastic polyamides having a desirable combination of physical properties and in particular better flow properties in the melt than the polysulphones themselves.

This invention relates to thermoplastic polymer blends, and in particular to blends which contain aromatic polysulphones and thermoplastic polyamides.

Aromatic polysulphones and methods of making them are described in British specifications 1,016,245; 1,060,546; 1,078,234; 1,109,842; 1,122,192; 1,133,561; 1,153,035; 1,153,528 and 1,177,183, United States specification 3,432,468, Netherlands specification 6903070 and German specifications 1,938,806 and 2,038,168 (the disclosure of each of which incorporated herein by reference). They are generally thermoplastic materials of high softening point and great stability even at high temperatures. Owing to their high softening points, and their generally rather high melt viscosities at even higher temperatures, however, specially adapted equipment is often required for fabricating them into shaped articles by moulding or extruding from the melt.

It has now been found that aromatic polysulphones and thermoplastic polyamides form blends with a desirable combination of physical properties referred to in more detail later. This is a surprising discovery, because mixtures of different polymeric material are usually mechanically weak.

According to the invention there are provided thermoplastic polymer blends which contain from 99% to 1% of one or more aromatic polysulphones and from 1% to 99% of one or more thermoplastic polyamides, the proportions being by weight based on the total weight of thermoplastic polymeric material.

The aromatic polysulphones described in the above-mentioned British specifications comprise repeating units of the formula —Ar—SO₂— in which Ar is a bivalent aromatic radical and may vary from unit to unit in the polymer chain (so as to form copolymers of various kinds). Thermoplastic polysulphones generally have at least some units of the structure

in which Z is oxygen or sulphur or the residue of an aromatic diol such as a 4,4′-bisphenol. One example of such a polysulphone has repeating units of the formula

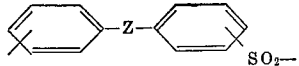

another has repeating units having the formula

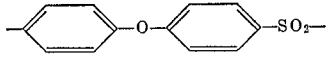

and others (which are commercially available in the United States of America) are said to have repeating units of the formula

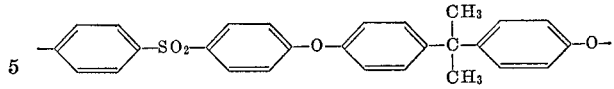

(Union Carbide Corporation) or copolymerised units in various proportions of the formulae

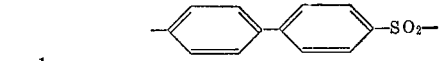

and

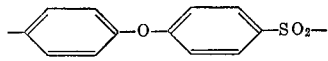

(Minnesota Mining and Manufacturing Company). The thermoplastic polysulphones may also have repeating units having the formula

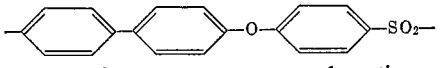

By a polyamide we mean a condensation product which contains recurring aromatic and/or aliphatic amide groups as integral parts of the main polymer chain, such products being known generically as "nylons." These may be obtained by polymerising a monoaminomonocarboxylic acid or an internal lactam thereof having at least two carbon atoms between the amino and carboxylic acid groups; or by polymerising substantially equimolecular proportions of a diamine which contains at least two carbon atoms between the amino groups and a dicarboxylic acid, or by polymerising a monoaminocarboxylic acid or an internal lactam thereof as defined above together with substantially equimolecular proportions of a diamine and a dicarboxylic acid. The dicarboxylic acid may be used in the form of a functional derivative thereof, for example an ester.

The term "substantially equimolecular proportions" (of the diamine and of the dicarboxylic acid) is used to cover both strict equimolecular proportions and the slight departures therefrom which are involved in conventional techniques for stabilising the viscosity of the resultant polyamides.

As examples of the said monoaminomonocarboxylic acids or lactams thereof there may be mentioned those compounds containing from 2 to 16 carbon atoms between the amino and carboxylic acid groups, said carbon atoms forming a ring with the —CO.NH— group in the case of a lactam. As particular examples of aminocarboxylic acids and lactams there may be mentioned ε-aminocaproic acid, butyrolactam, pivalolactam, caprolactam, capryl-lactam, enantholactam, undecanolactam, dodecanolactam and 3- and 4-amino benzoic acids.

Examples of the said diamines are diamines of the general formula H₂N(CH₂)ₙNH₂ wherein n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine.

C-alkylated diamines, e.g. 2,2-dimethylpentamethylenediamine and 2,2,4- and 2,4,4-trimethylhexamethylenediamine are further examples. Other diamines which may be mentioned as examples are aromatic diamines, e.g. p-phenylenediamine, 4,4′-diaminodiphenyl sulphone, 4,4′-diaminodiphenyl ether and 4,4′-diaminodiphenylmethane; and cycloaliphatic diamines, for example diaminodicyclohexylmethane.

The said dicarboxylic acids may be aromatic, for example isophthalic and terephthalic acids. Preferred dicarboxylic acids are of the formula HOOC·Y·COOH wherein Y represents a divalent aliphatic radical containing at least 2 carbon atoms, and examples of such acids are sebacic acid, octadecanedioic acid, suberic acid, azelaic acid, undecanedioic acid, glutaric acid, pimelic acid, and especially adipic acid. Oxalic acid is also a preferred acid.

Specifically the following polyamides may be incorporated in the thermoplastic polymer blends of the invention:

polyhexamethylene adipamide (nylon 6:6)
polypyrrolidone (nylon 4)
polycaprolactam (nylon 6)
polycapryllactam (nylon 8)
polyundecanolactam (nylon 11)
polydodecanolactam (nylon 12)
polyhexamethylene azelaiamide (nylon 6:9)
polyhexamethylene sebacamide (nylon 6:10)
polyhexamethylene isophthalamide (nylon 6:iP)
polymetaxylylene adipamide (nylon MXD:6)
polyamide of hexamethylenediamine and n-dodecanedioic acid (nylon 6:12)
polyamide of dodecamethylenediamine and n-dodecanedioic acid (nylon 12:12)

Nylon copolymers may also be used, for example copolymers of the following:

hexamethylene adipamide/caprolactam (nylon 6:6/6)
hexamethylene adipamide/hexamethylene-isophthalamide (nylon 6:6/6.P)
hexamethylene adipamide/hexamethylene-terephthalamide (nylon 6:6/6T)
trimethylhexamethylene oxamide/hexamethylene oxamide (nylon trimethyl-6:2/6:2)
hexamethylene adipamide/hexamethylene-azelaiamide (nylon 6:6/6:9)
hexamethylene adipamide/hexamethylene-azelaiamide/caprolactam (nylon 6:6/6:9/6)

The blends of the invention are preferably made by mixing the molten polymers, for example by extrusion or in a Banbury mixer. Some of the polysulphones, however, have softening points so high that decomposition of the polyamide might occur during melt blending, and the blends are then made by mixing the polymers in solution in a suitable solvent for both of them, e.g. phenol or cresol.

Alternatively, the preformed polyamide can be readily dispersed in a solution of the polysulphone obtained directly from the polymerisation reaction in which the polysulphone is formed, and the polysulphone/polyamide blend is then isolated from the solution in the way which would have been employed for isolating the polysulphone itself.

Yet another way of forming the blends of the present invention is to carry out the polymerisation reaction giving rise to the polyamide in the presence of preformed polysulphone. For example the polysulphone may be dissolved in caprolactam which may then be polymerised in known manner.

The polysulphone/polyamide blends of the invention may be mixed with particles of other polymeric materials having special properties, e.g. elastomeric materials and polytetrafluoroethylene. They may contain reinforcing fillers, for example glass, asbestos and carbon fibres, and other materials conferring various desired characteristics, e.g. solid lubricants, (e.g. graphite or molybdenum disulphide), abrasives (e.g. carborundum), friction-conferring materials, magnetic materials (e.g. for recording tapes), photosensitisers, and any other materials for which the blends of the invention make suitable vehicles. They may contain dyes and pigments, and an increased dyeability may be of advantage in fibres made from the blends.

The blends of the invention may be fabricated in any desired form, such as fibre, film, and mouldings or extruded products of any desired shape. Plasticisers (e.g. diphenyl sulphone and substituted aryl sulphonamides) may also be added to facilitate melt processing. The incorporation of particles of elastomeric material, especially of ethylene copolymers and ionomers, generally enables tougher articles to be made.

Blends containing more than 50% of polyamide resemble the untreated polyamides in some respects but are characterised by a considerable improvement in certain mechanical properties such as Rockwell hardness, and often impact strength, even with 5% of polysulphone. A particularly preferred range of polysulphone for this purpose is from 5 to 40%.

Blends in which the polysulphone predominates are coherent and usually tough materials having better flow properties in the melt than the polysulphones themselves, and, in sheet or fibre form, a greater resistance to repeated folding. A preferred range of nylon for this purpose is from 10% to 40 or 50%.

According to a further feature the thermoplastic polymer blend of the invention may contain an amine-ended polyamide.

By an amine-ended polyamide we mean a polyamide which contains recurring amide groups as an integral part of the main polymer chain, and which has an excess of amine end-groups over carboxyl end-groups. Preferred amine-ended polyamides are those having from 20 to 140 gram equivalents of amine end-groups in excess of the number of gram equivalents of carboxyl end-groups per $10^6$ grams of polymer.

Suitable polyamides for use in this feature of the invention are those previously enumerated, but made by employing the necessary excess of diamine over dicarboxylic acid to ensure a preponderance of amine end-groups or, in the case of lactam polymers, by terminating the polymerisation in the presence of an amine, particularly a diamine, or by polymerising an ester of the aminocarboxylic acid.

A particular class of thermoplastic polyamide useful in the present invention comprises at least 50% by weight of a polyamide as hereinbefore defined and from 0.1% to 50% (preferably 1% to 4%) by weight of a copolymer of an olefin, especially ethylene, and an $\alpha,\beta$-unsaturated carboxylic acid or its hydroxyalkyl ester, e.g. a copolymer of ethylene and hydroxyethyl methacrylate, optionally with for example up to 5% by weight of methyl methacrylate.

According to a further feature the thermoplastic copolymer blend of the invention may contain a nucleated polyamide.

By a nucleated polyamide we mean a polyamide into which has been incorporated a nucleating agent in order to increase the rate of crystallisation. The incorporation of nucleating agents in this way enables shorter time cycles to be employed when the polysulphone/polyamide blends are used in injection moulding processes.

As examples of nucleating agents there may be mentioned talc, graphite, alumina and high melting polymers such as finely divided polytetrafluoroethylene.

The nucleating agents may be present in the polyamide in amounts of from 0.001% to 10% by weight, and preferably from 0.01% to 5% by weight, and may be incorporated into the polyamides before or during the polymerisation process.

EXAMPLE I

A poly(diphenylene ether sulphone) having repeat units of the structure

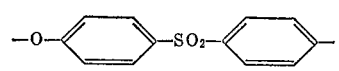

and prepared in a manner similar to that described in Example 3 of British patent specification 1,153,035 had a reduced viscosity of 0.45, measured on a solution of 1 g. of polymer in 100 cm.$^3$ of dimethylformamide at 25° C. This polymer (60 g.) together with Hoechst wax PA 190 (0.5 g.) as an external lubricant and 20 g. of the polyamides given below were blended in a Brabender "Plasticorder" (Brabender, Duisburg am Rhein, Germany).

The temperature of the circulating oil in the heater of the "Plasticorder" was 280° C. Mixing was carried out at 100 r.p.m. in the 55 cm.³ mixing head, allowing 10 minutes for mixing. The blends prepared and their properties are given in the table below.

Samples were cooled, chipped and compression-moulded at 280° C. Films moulded in this way were tough and the blends showed enhanced crease fold resistance over the polysulphone.

The results are given in the following Table I.

TABLE I

| Test No. | Nylon | Minimum torque in Brabender "Plasticorder" in metre/grams | Impact strength, kj./m.² | Number of folds to failure | Vicat softening point, °C. Full | $^{1}/_{10}$ |
|---|---|---|---|---|---|---|
| 1 | None | 3,800 | 4.8 | 15–20 | 217.6 | 208.8 |
| 2 | 12:12 | 2,600 | 5.3 | | 215.1 | 208.2 |
| 3 | 6:12 | 2,300 | 6.1 | >300 | | |
| 4 | 11 | 2,800 | 12.5 | >300 | 216.2 | 210.0 |
| 5 | 12 | 2,000 | 3.5 | | 211.8 | 208.8 |
| 6 | 6:9 | 2,700 | 12.8 | | 211.0 | 204.0 |
| 7 | 6 | 2,500 | 4.6 | >300 | 211.8 | 204.8 |
| 8 | 12 | 1,800 | 4.2 | | 202.3 | 195.0 |
| 9 | 6:6 | 2,500 | 7.6 | | 219.0 | 210.0 |
| 10 | "Trogamid" T | 2,600 (3,950) | 2.3 | | 213.2 | 206.0 |

In the test of notched specimen impact strength, a specimen 60 mm. long, 6.5 mm. wide and 3 mm. thick was given a parallel-sided notch 2.8 mm. deep (tip radius 2.0 mm.) in the centre of one edge. It was supported between two supports 50 mm. apart and struck centrally on the edge opposite the notch by a pendulum dropping from 30 cm. with more than sufficient energy to break the specimen. From the residual energy of the pendulum the energy required to break the specimen was calculated and divided by the cross-sectional area of the specimen at the notch. The resulting value (expressed in kj./m.²) represents the energy required to break the material.

In carrying out the test headed "No. of folds to failure," a film sample was creased, then folded through 360° and again creased; this folding through 360° and creasing was repeated and the number of folds to failure noted.

In Test No. 8 the polyamide was material supplied by Toyo Rayon.

In Test No. 10, 64 g. of polysulphone were mixed with 16 g. of the polyamide supplied under the trademark "Trogamid" T. (Dynamit Nobel). The figure 3950 refers to the minimum torque for the polysulphone used in Test No. 10.

EXAMPLE II

In Tests 2–6 given below the specified number of parts of a polysulphone supplied by Union Carbide and Chemical Corporation as "Polysulfone" No. P 1700 and said to have repeating units of the formula

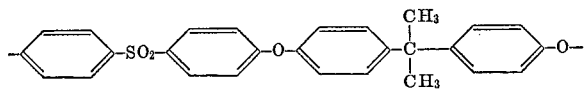

were added with shaking to the specified number of parts of capryl-lactam previously melted at 100–150° C. in a polymerisation tube; the polysulphone dissolved in the capryl-lactam to give a clear solution.

In Tests 7–10 the same materials were mixed in powder form in a "Moulinex" coffee grinder and the mixture placed in a bath at 75° C. and allowed to melt and sinter at this temperature for 1 hour.

In all tests the polysulphone/capryl-lactam mixture, together with 0.5 part water for every 10 parts capryl-lactam, was heated at 270° C. in a sealed tube under nitrogen for 6 hours to effect hydrolysis of the lactam and then the tube was opened while under a nitrogen atmosphere and heated for a further 2 hours at 270° C. to effect polymerisation of the capryl-lactam to Nylon 8. The resulting polymer blend was moulded at 275° C. under a pressure of 20 tons to give 1/8" thick discs and films and the products evaluated. The results are given in Table II.

TABLE II

| Test number | Polymer blend Polysulphone | Nylon 8 | Rockwell hardness, dry | Number of folds to failure | Vicat softening point, °C. Full | $^{1}/_{10}$ |
|---|---|---|---|---|---|---|
| 1 | 0 | 100 | R51 | | 172.0 | 144.0 |
| 2 | 10 | 90 | R105.5 | >500 | 193.0 | 102.6 |
| 3 | 20 | 80 | R96 | >500 | 186.0 | 130.5 |
| 4 | 30 | 70 | R108.5 | >500 | 189.0 | 87.7 |
| 5 | 40 | 60 | R99 | | 131.0 | 92.0 |
| 6 | 50 | 50 | R110 | >500 | 156.1 | 142.0 |
| 7 | 60 | 40 | R113 | >500 | 160.8 | 146.0 |
| 8 | 70 | 30 | R114 | 13 | 135.2 | 118.0 |
| 9 | 80 | 20 | R106 | 12 | 181.0 | 172.0 |
| 10 | 90 | 10 | R118 | 10 | 180.6 | 172.0 |
| 11 | 100 | 0 | R117.5 | 15 | 189.0 | 180.0 |

EXAMPLE III

A poly(diphenylene ether sulphone) similar to that described in Example I but having a reduced viscosity of 0.42 was blended with a range of polyamides in weight ratio 90/10 polysulphone/polyamide using a "Transfermix" at 325° C. or a "Transfermix" at 325° C. followed by a static mixer of the "Kenics" type at 300° C. Samples of blend were compression moulded at 280° C. Results of impact strength and hardness testing are presented in Table III.

TABLE III

| Polyamide | Mixing technique | Impact strength (kj./m.²) 2 mm. notch | Rockwell hardness |
|---|---|---|---|
| Dodecamethylene diamine, terephthalic acid/hexamethylene diamine, terephthalic acid (75/25 molar). | "Transfermix" | 9.72 | M85 |
| Hexamethylene diamine, adipic acid/hexamethylene diamine, isophthalic acid/caprolactam (80/10/10 by weight). | do | 8.17 | M82 |
| Hexamethylene diamine, adipic acid/hexamethylene diamine, isophthalic acid (75/25 by weight). | do | 10.54 | M85 |
| Hexamethylene diamine, A, 3-(4-carboxymethoxyphenyl) propionic acid. | do | 18.45 | M92.5 |
| Hexamethylene diamine, B, terephthalic acid/caprolactam (62/38 by weight). | do | 7.55 | M92 |
| Decamethylene diamine, C, 1,4-di(2-carboxyethyl) benzene. | do | 2.47 | M90 |
| A | "Transfermix" and static mixer. | 6.53 | M95 |
| B | do | 8.02 | M90 |
| C | do | 2.43 | M87 |

I claim:

1. A thermoplastic polymer blend consists essentially of 99% to 1% by weight of at least one aromatic polysulphone which consists essentially of repeating units of the formula $ArSO_2$ where Ar is a bivalent aromatic radical, both free valencies of the $SO_2$ group being attached to aromatic carbon atoms and there being no $—SO_2—$ groups present in the group Ar, and 1% to 99% by weight of at least one polyamide containing repeating carbonamide groups as an integral part of the polymer chain.

2. A thermoplastic polymer blend according to claim 1 wherein the amount of said polysulfone is 5% to 40% by weight.

3. A thermoplastic polymer blend according to claim 1 containing 10% to 40% by weight of at least one polyamide.

4. A thermoplastic polymer blend according to claim 1 in which the aromatic polysulphone comprises repeat units having the formula

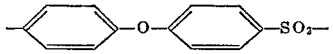

5. A thermoplastic polymer blend according to claim 1 in which the aromatic polysulphone comprises repeat units having the formula

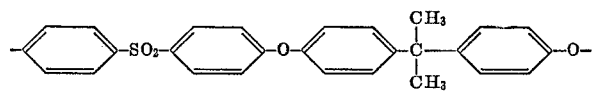

References Cited
UNITED STATES PATENTS

| | | | |
|---|---|---|---|
| 3,403,200 | 9/1968 | Randall | 260—857 |
| 3,431,238 | 3/1969 | Borman | 260—857 |
| 3,522,326 | 7/1970 | Bostick | 260—857 |
| 3,544,519 | 12/1970 | Burrows | 260—857 |
| 3,622,525 | 11/1971 | Miller | 260—858 |
| 3,655,822 | 4/1972 | McGrath | 260—857 |
| 3,657,385 | 4/1972 | Matzner | 260—857 |
| 3,663,507 | 5/1972 | Vogel | 260—857 |

PAUL LIEBERMAN, Primary Examiner

U.S. Cl. X.R.

260—37 N, 49, 857 L, 857 UN